United States Patent
Ida et al.

(10) Patent No.: US 6,961,566 B2
(45) Date of Patent: Nov. 1, 2005

(54) FREQUENCY SEARCH METHOD FOR A MOBILE STATION AND A MOBILE STATION THEREWITH

(75) Inventors: Takehiro Ida, Yokosuka (JP); Kazufumi Yunoki, Yokosuka (JP); Mitsuo Iwanaga, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 458 days.

(21) Appl. No.: 10/153,896

(22) Filed: May 24, 2002

(65) Prior Publication Data

US 2002/0177441 A1    Nov. 28, 2002

(30) Foreign Application Priority Data

May 28, 2001    (JP) .............................. 2001-159440

(51) Int. Cl.[7] .............................................. H04Q 7/20
(52) U.S. Cl. ................................... 455/434; 455/452.1
(58) Field of Search ............................. 455/432.1, 434, 455/435.1, 435.2, 161.1, 166.2, 450, 192.1, 455/452.1, 452.2, 458, 179.1, 188.1, 525, 455/451

(56) References Cited

U.S. PATENT DOCUMENTS

| | | | |
|---|---|---|---|
| 4,978,944 A * | 12/1990 | Andros et al. | ............. 340/7.41 |
| 5,845,198 A | 12/1998 | Bamburak et al. | |
| 5,937,351 A | 8/1999 | Seekins et al. | |
| 6,112,055 A * | 8/2000 | Bennett et al. | ............. 340/7.34 |
| 6,148,203 A | 11/2000 | Renko et al. | |
| 6,219,549 B1 * | 4/2001 | Tat | ............................ 455/434 |
| 6,259,917 B1 * | 7/2001 | Elzein | ..................... 455/435.2 |
| 6,778,827 B1 * | 8/2004 | Anderson et al. | ........... 455/434 |

* cited by examiner

*Primary Examiner*—Jean Gelin
(74) *Attorney, Agent, or Firm*—Oblon, Spivak, McClelland, Maier & Neustadt, P.C.

(57) ABSTRACT

A smaller number of frequencies are dynamically defined, from which a frequency to be used is first searched, failing which, all the frequencies available to a particular mobile communication system are searched, thereby frequency search is efficiently performed with a reduced power consumption.

10 Claims, 2 Drawing Sheets

FREQUENCY SEARCH METHOD FOR A MOBILE STATION AND A MOBILE STATION THEREWITH

BACKGROUND OF THE INVENTION

The Technical Field to which Invention Belongs

1. Field of the Invention

The present invention generally relates to a method of searching a frequency at which a mobile station, such as a portable telephone, communicates with a base station, and specifically relates to the method of searching a frequency which should be used for communication between the mobile station and the base station from a plurality of predetermined frequencies, wherein the mobile station searches the frequency to be used.

Further, the present invention relates to a mobile station that searches the frequency to be used in accordance with the frequency search method herein.

2. Description of the Prior Art

In a mobile communications system, such as a W-CDMA system, a number of frequencies (about 300) are prescribed for mobile communications. A communication carrier is allocated with some of the frequencies, and offers a mobile communications service using the allocated frequencies.

The communication carrier can decide how to use the allocated frequencies in the mobile communications service freely. For example, different sets of frequencies may be assigned to each of predetermined areas, such that a mobile communication in an area is offered with a set of frequencies, which is different from a set of frequencies used in another area. Otherwise, a service area may be defined such that an accommodation capacity of the service area (the number of mobile stations) is defined, and the number of frequencies assigned to the service area can be determined.

Thus, the number of frequencies that a mobile station can use can be greater than one in the mobile communications service offered by the communication carrier. Therefore, the mobile station has to be able to detect which frequency is actually transmitted from a radio base station, when the mobile station turns the power supply ON, and when it advances into a service area from another service area. Specifically, the mobile station compares an actually received frequency with each of frequencies assigned to the communication carrier (Band_Search). When a match is found at a frequency, the mobile station recognizes that the frequency should be used for communication.

Problem(s) to be Solved by the Invention

As seen from above, if the number of frequencies to be scanned is great, scanning time increases, and battery power consumption in a mobile station becomes large.

The above problem will become even greater when the so-called roaming is considered, that is when a mobile station is capable of accessing a different communication carrier's mobile communications system. In roaming, the number of the frequencies to be searched can be as great as about 300 in the W-CDMA system.

SUMMARY OF THE INVENTION

It is a general object of the present invention to provide a method and an apparatus that substantially obviate one or more of the problems caused by the limitations and disadvantages of the related art.

A first objective of the present invention is offering an efficient frequency search method that enables a mobile station to detect a frequency to be used from a plurality of frequencies.

Further, a second objective of the present invention is offering a mobile station that searches frequencies according to the frequency search method.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a method and an apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides the frequency search method wherein a plurality of sets of frequencies are defined, with each set being assigned a priority, such that a first search is conducted over a smaller number of frequencies, and a second search is conducted over a larger number of frequencies, which may be all possible frequencies, if the first search fails. A third set, and so on, may be defined, such that the number of frequencies to be searched is gradually increased, until all frequencies are searched when necessary. The method also includes a process in which a higher-priority set of frequencies shall include higher-likely frequencies, such that a speedier frequency search is achieved with a lower power consumption. The present invention also includes a mobile station that uses the frequency search method described herein.

Means for Solving the Problem

The frequency search method includes an all-frequency search processing step that searches all frequencies that can be used by a mobile station of a mobile communication system, and one or more subset-frequency search processing step(s) that search(es) a limited number of frequencies (a subset of frequencies selected from all the frequencies) that are likely to be used. In the frequency search method, priorities are assigned to the subset-frequency search processing steps. According to the priority, each of the subset-frequency search processing steps is performed, with the all-frequency search processing step to be performed ultimately, if a frequency to be used is not detected by any of the subset-frequency search processing steps.

By the frequency search method as mentioned above, a frequency to be used is searched from a subset of likelier frequencies in the first place. If the frequency to be used is not detected, search is performed for all the frequencies that can be used by the mobile station in the mobile communication system. Before searching all the frequencies, the frequency to be used by the mobile station may be detected from the subset of likelier frequencies.

"All the frequencies" referred to in this document may be all the frequencies used by a mobile communication carrier, or all the frequencies allocated to a particular communication system, such as W-CDMA, and used by a plurality of communication carriers in consideration of the so-called roaming service.

Criteria for selecting frequencies of the frequency subsets may be freely defined so long as the number of frequencies in a subset is smaller than the number of all the frequencies. However, the criteria is desired to be such that a frequency to be used can be determined efficiently.

Each of the subsets of frequencies is assigned a priority such that a smaller number of frequencies are searched first, a larger number of frequencies are searched next, before all the frequencies are searched.

Further, the priority may be assigned such that a subset of likelier frequencies are searched first, a subset of less likely frequencies are searched next, before all the frequencies are searched.

In this manner, an efficient frequency search is obtained.

In order to reduce power consumption of frequency searching when the mobile station is outside a service area, the frequency search method of the present invention includes subset-frequency search steps for a smaller number of frequencies, if the all-frequency search does not detect a frequency to be used.

Since the subset-frequency search consumes less power than a all-frequency search, the present invention requires a less power consumption.

There may be a situation where a base station uses a frequency that is not used previously, therefore, not in the subset of the frequencies. To cope with this situation, the frequency search method includes a step by which the all-frequency search is performed after a predetermined interval.

The predetermined interval may be defined by a timer that measures elapsed time, or by counting the number of executions of the subset-frequency search step.

In view that the mobile communications system tends to assign a frequency that is used previously again, the frequency search method of the present invention includes a step in which the subset of the frequencies is updated by a recently assigned frequency.

In view that the mobile communications system tends to assign a frequency from frequencies that are used previously, the frequency search method of the present invention includes a step in which frequencies of a subset reflect a history of previous frequency assignments.

The present invention includes a mobile station that performs the frequency search according to the frequency search method of the present invention.

DESCRIPTION OF THE PREFERRED EMBODIMENTS

Embodiments of the Invention

In the following, embodiments of the present invention will be described with reference to the accompanying drawings.

Figure 1:
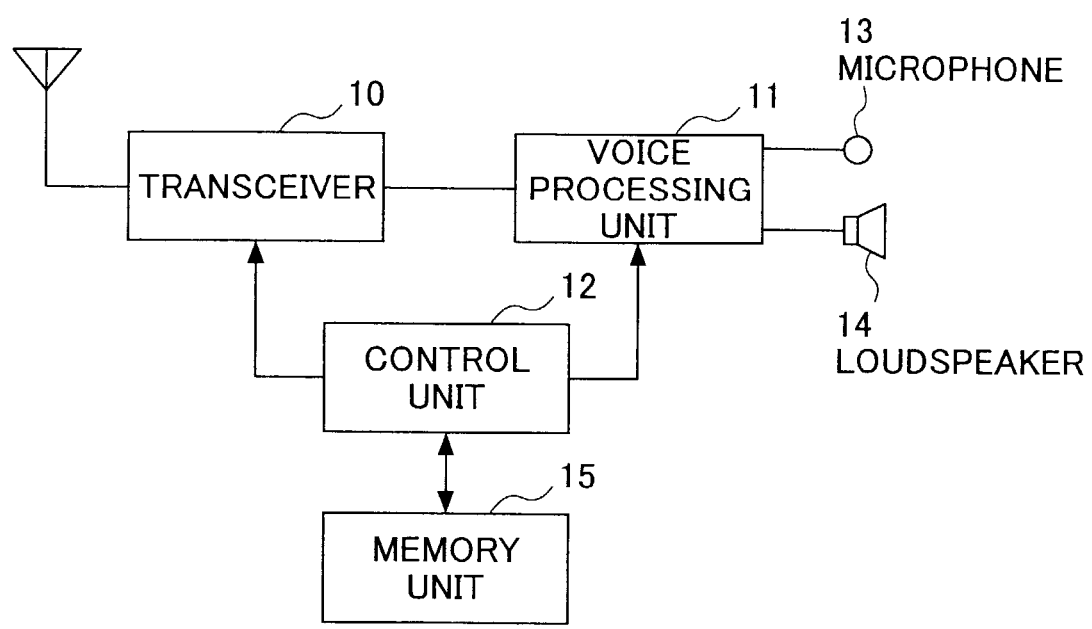
FIG. 1 is a block diagram showing an example of basic configuration of a mobile station of an embodiment of implementation of the present invention.

FIG. 1 shows a basic configuration of a mobile station (portable telephone) of an embodiment of the present invention.

As shown in FIG. 1, the mobile station includes a transceiver unit 10, a voice processing unit 11, a control unit 12, a microphone 13, a loudspeaker 14, and a memory unit 15. The transceiver unit 10 communicates with a radio base station in a mobile communications system using a frequency obtained by frequency search processing that is described later. The voice processing unit 11 performs predetermined processing (voice encoding, diffusion processing, etc.) of a sound signal supplied from the microphone 13, according to, for example, W-CDMA practices, and provides the sound signal thus processed to the transceiver unit 10. The processed sound signal is transmitted from the transceiver unit 10. Further, the voice processing unit 11 performs predetermined processing (reverse diffusion process, voice decoding, etc.) of a sound signal received from the transceiver unit 10, according to, for example, W-CDMA practices. The processed signal is provided to the loudspeaker 14 such that an audio signal is output from the loudspeaker 14.

The control unit 12 controls the transceiver unit 10 and the voice processing unit 11, such that a mobile telephone communication is provided to the mobile station. Further, the control unit 12 performs frequency search processing, when the power supply of the mobile station is turned on. The memory unit 15 stores a frequency information list used by the frequency search processing, while storing information (a telephone directory, various constants, etc.) required for the telephone communication. The frequency search processing is performed according to a procedure such as shown in FIG. 2.

Figure 2:
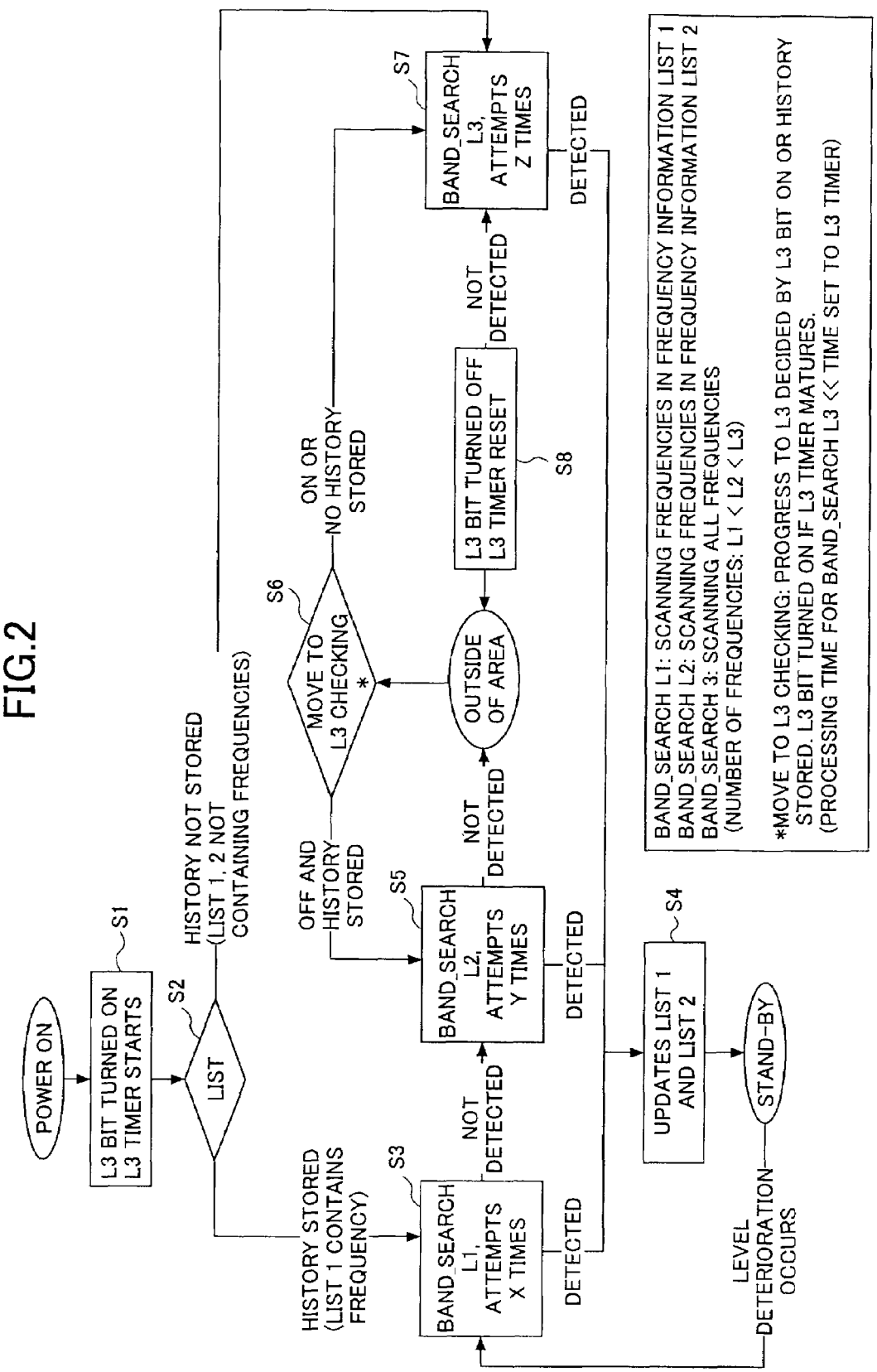
FIG. 2 shows a flowchart showing an example of a process of frequency search of the present invention.

The frequency search processing of FIG. 2 includes three steps, namely, a first search processing step L1 (Band_Search L1), a second search processing step L2 (Band_Search L2), and a third search processing step L3 (Band_Search L3).

The first search processing step L1 performs frequency search for frequencies set in a frequency information list 1. The second search processing step L2 performs frequency search for frequencies set in a frequency information list 2. The third search processing step L3 performs frequency search processing for frequencies set in a frequency information list 3.

The frequencies set in each of the frequency information lists 1, 2, and 3 used at each of the search processing steps L1, L2, and L3, respectively, is defined based on operating conditions of each of the frequencies in communications served by the mobile communications system. A limited number of frequencies with a high possibility (for example, P % or higher) of being used are set to the frequency information list 1, and all the frequencies that are used by the mobile communications system by which a mobile station communicates are set to the frequency information list 3. The frequency information list 2 includes a larger number of the frequencies than the frequency information list 1, which have a relatively higher possibility of being used. Frequencies stored in the frequency lists 1 and 2 may be dynamically adjusted, based on actual frequency usage situations.

Since the number of frequencies generally used in the mobile communications system of a W-CDMA method is finite, a probability that a frequency detected by the last search processing is detected by a next search processing is high. Then, the frequency detected by the last search processing is included in the frequency information list 1. Further, frequencies previously detected by the search processing (detection frequency history) are included in the frequency information list 2 from same viewpoint. Further, all the frequencies (for example, about 300 frequencies) specified to the mobile communication system (for example, W-CDMA) are set to the frequency information list 3. Thus, by setting up all the frequencies to the frequency information list 3, roaming to another carrier that operates the same communication system (e.g., W-CDMA) becomes possible.

When the power supply of a mobile station is turned on, the frequency search processing starts. First, at step S1, a shift bit to the third search processing step L3 (henceforth L3 shift bit) is turned on, and a shift timer to the third search processing step L3 (henceforth L3 shift timer) is started, as shown in FIG. 2. The L3 shift bit is a bit beforehand set up in the control unit 12. Further, the L3 shift timer is provided in the control unit 12, which sets up a period after which the L3 shift bit is turned on again. The period to be set to the L3 shift timer (for example, about 4 hours) is sufficiently longer than a period required for scanning all the frequencies set in the frequency information list 3 in the third search processing step L3.

When the L3 shift bit is turned on, and the L3 shift timer is started, a check is made as to whether a frequency is set in the frequency information list 1 (S2). If a frequency is set in the frequency list 1, the frequency list 1 is selected, and the first search processing step L1 is performed targeting the frequency in the frequency information list 1 (S3). Then, a check is made as to whether the frequency set in the frequency list 1 is in agreement (hit) with a frequency of a receiving signal. If a hit is detected, the frequency set in the frequency information list 1 and the frequency information list 2 are updated with the detected frequency (S4), and the mobile station stands by at the frequency.

On the other hand, if the frequency set in the frequency information list 1 does not match with the frequency of the received signal after a predetermined number of attempts, which may occur for a certain reason (for example, a movement of the mobile station from an area to another area that uses a different frequency, a temporary and partial service suspension for maintenance of a mobile communications system, and a trouble in the mobile communications system), the frequency information list 2 is chosen, and the second search processing step L2 is performed (S5).

At the second search processing step L2, a check is made as to whether one of frequencies set in the frequency information list 2 is in agreement with the frequency of the received signal, by scanning the frequencies one by one. If a frequency in agreement with the frequency of the received signal is detected, the frequency information list 1 and the frequency information list 2 are updated accordingly (S4). Then, the mobile station stands by at the frequency.

On the other hand, if the frequency of the received signal is not found in the frequency information list 2 after executing the second search processing step L2 for a predetermined number of times (y-times), the control unit 12 determines that the mobile station is outside a service area, and further checks whether the third search processing step L3 should be performed (S6). Specifically, a check is made whether the L3 shift bit is in an ON state. If the L3 shift bit is in an ON state, the frequency information list 3 will be chosen and the third search processing step L3 will be performed (S7).

At the third search processing step L3, all the frequencies in the frequency information list L3 are scanned one by one, and it is checked whether a frequency is in agreement with the frequency of the received signal. Since all the frequencies allocated to the communication mode of the mobile communications system (e.g., W-CDMA) are stored in the frequency information list 3, a mobile station shall find a frequency at this third search processing step L3 so long that the mobile station is inside a service area. If the frequency is found, the frequency information list 1 is updated by the detected frequency, and the detected frequency is set in the frequency information list 2 (S4). Further, the mobile station stands by at the frequency.

In the event that no frequencies in the frequency information list 3 are detected from the received signal after executing the search processing step L3 for a predetermined number of times (z times), the mobile station is considered outside of the service area, and the L3 shift bit is put into an OFF state, and the L3 shift timer is reset (S8). By resetting the L3 shift timer, and putting the L3 shift bit in the OFF state, the third search processing step L3 is not performed until the predetermined time in the L3 shift timer elapses and the L3 shift bit is put into an ON state again.

As mentioned above, if the frequency of the received signal cannot be determined in the third search processing step L3, the mobile station is determined to be outside the service area. Then, whether the process should proceed to the third search processing step L3 is checked, based on a state of the L3 shift bit (S6). Since the L3 shift bit is made into the OFF state in this case as mentioned above, the process does not proceed to the third search processing step L3, but rather whether a frequency (operating frequency history) is set in the frequency information list 2. If a frequency is set up in the frequency information list 2, the second search processing step L2 will be carried out for the predetermined number of times (y times)(S5).

If no frequencies are detected as a result of repeated executions of the second search processing step L2, it is determined that the mobile station is still outside the service area. Then, it is checked whether the L3 bit is in an ON state (i.e., whether or not to progress to the third search processing step L3) repeatedly at a predetermined interval (S6). Every time the check is made, the second search processing step L2 (S5) is executed. If the mobile station advances into the service area, while the process is repeated, one of the frequencies set in the frequency information list 2 in the second search processing step L2 will be detected as matching with the received signal. Then, the frequency information list 1 and the frequency information list 2 are updated by the detected frequency (S4), and the mobile station stands by at the detected frequency.

While the second search processing step L2 (S5) is repeated at the predetermined interval, the mobile station being outside the service area, if the predetermined period elapses in the timer, the L3 bit is turned into an ON state. Consequently, it is determined, in the step S6, that the third search processing step L3 should be performed, and the third search processing step L3 is executed again (S7). If a frequency is detected by the third search processing step L3, the frequency information list 1 and the frequency information list 2 are updated with the detected frequency (S4), noting that a mobile station is inside the service area. The mobile station stands by at the detected frequency.

If a frequency is not detected through the process of the third search processing step L3 that is repeated the predetermined number of times (z times), the L3 shift bit is put into an OFF state, and the L3 shift timer is reset (S8) as described previously. Subsequently, whenever the OFF state of the L3 bit is detected at the predetermined interval (S6), execution of the second search processing step L2 is repeated for the predetermined number of times (S5).

In this manner, when the power supply of the mobile station is turned on, the first search processing step L1 based on the frequency information list 1 is performed, followed by the second search processing step L2 based on the frequency information list 2, and the third search processing step L3 based on the frequency information list 3. So long as the mobile station is inside the service area, it is highly probable that one of the frequencies registered in the frequency information list 1 and the frequency information list 2 is found to be the frequency used by the corresponding base station. In almost all cases, the frequency is found by one of the first search processing step L1 and the second search processing step L2. Therefore, the search time for detecting the frequency that the mobile station should use can be determined quickly, helping reduce the power consumption of the search processing.

Further, if the mobile station is outside the service area, the second search processing step L2, which searches a smaller number of frequencies than the third search processing step L3, is repeated at a predetermined cycle (a cycle of S6), after the third search processing step L3 is performed the predetermined number of times (z times), until a predetermined period elapses and the third search processing step L3 is performed again. In this manner, the mobile station that is outside the service area can reduce power consumption for frequency searching. When no frequency is detected through the second search processing step L2 for a long period, the base station may be using a new frequency for a reason. In view of this possibility, the third search processing step L3 is performed at an interval predetermined by the timer, ensuring detecting a frequency that the mobile station should use.

In addition, when the power supply of the mobile station is turned on for the first time, no frequencies are set in the frequency list 1 and the frequency list 2. In this case, the step S2 in FIG. 2 determines that no frequencies are set in the frequency information list 1 and the frequency information list 2, and the third search processing step L3 is performed first (S7). If the mobile station is inside the service area, a frequency is detected at the third search processing step L3. The detected frequency is then set in the frequency information list 1 and the frequency information list 2 (S4), and the mobile station stands by at the detected frequency.

On the other hand, if the mobile station is outside the service area, with no frequencies setup in the frequency information list 1 and the frequency information list 2, based on the judgment result of S6, the third search processing step L3 is performed repeatedly (S7->S8->S6->S7).

In the event that the mobile station is in a stand-by mode, pursuant to the processing mentioned above, and experiences deterioration of reception level (caused by a high-speed movement, a recession to outside of the service area, and the like), the first search processing step L1 (S3) is performed. Then, processing according to the procedure mentioned above is performed.

The above descriptions are made concerning the embodiment with three processing steps, namely, the first search processing step L1, the second search processing step L2, and the third search processing step L3. However, the number of the search processing steps may be two, four or more than five. Further, the number of frequencies that are searched in each of the steps can be decided such that an efficient search processing is attained, according to the situation of use of the frequency in a mobile communications system.

Furthermore, frequencies set as search targets in a processing step can be excluded from another processing step. For example, a frequency detected by the last search processing and set in the frequency information list 1 may be excluded from the frequency information list 2, and frequencies included in the frequency information list 1 and the frequency information list 2 may be excluded from the frequency information list 3.

In the embodiment described above, the third search processing step L3 (S7) shown in FIG. 2 corresponds to the all-frequency search procedure and the all-frequency search means in the claim that follows. Similarly, the first search processing step L1 (S3) and the second search processing step L2 (S5) correspond to the subset-frequency search procedure and the subset-frequency search processing means.

The procedure of moving from the first search processing step L1 (S5), the second search processing step L2 (S5), and the step S6 to the third search processing step L3 (S7), shown in FIG. 2, corresponds to the first search control means in the claim that follows. Similarly, the procedure of moving from the third search processing steps L3 (S7), the step S8, and the step S6 to the second search processing step L2 (S5) corresponds to the second search control means, and the procedure to move to the third search processing step L3 (S7) from the step S6 when the L3 bit is turned on while the second search processing step L2 (S5) is being performed corresponds to the third search control means.

Effect of the Invention

As described above, before searching all the frequencies that can be used by a mobile station in a mobile communications system is performed, one or more subsets of frequencies that are likelier to be chosen as a frequency to be used are searched. In this manner, an efficient frequency search is realized.

Further, according to the present invention, a mobile station that can efficiently search the frequency to be used according to the frequency search method is realized.

Further, the present invention is not limited to these embodiments, but various variations and modifications may be made without departing from the scope of the present invention.

The present application is based on Japanese priority application No. 2001-159440 filed on May 28, 2001, with the Japanese Patent Office, the entire contents of which are hereby incorporated by reference.

What is claimed is:

1. A frequency search method that determines a frequency to be used by a mobile station for communication in a mobile communication system, comprising:

one or a plurality of subset-frequency search procedures each of which is configured to search the frequency to be used by the mobile station for communication from a subset of frequencies selected, based on predetermined criteria, out of all the frequencies that are allocated for the mobile communications system, each of the procedures being performed in a predetermined priority sequence assigned to each of the procedures until a frequency to be used is determined, and an all-frequency search procedure that searches a frequency to be used by the mobile station from all the frequencies that are allocated for the mobile communications system, which is performed when the subset-frequency search procedures for the selected frequencies fail, wherein said one or the plurality of the subset-freciuency search procedures are repeated if no frequencies are determined as the frequency to be used in the all-frequency search procedure, and the all-frequency search procedure is performed when a predetermined timing condition is satisfied while the subset-frequency search procedures are repeated without determining the frequency to be used.

2. The frequency search method as claimed in claim 1, wherein the plurality of the subset-frequency search procedures are configured such that a subset-frequency search procedure with a higher priority, which is to be performed earlier, searches fewer frequencies than other subset-frequency search procedures.

3. The frequency search method as claimed in claim 1, wherein the plurality of the subset-frequency search procedures are configured such that a subset-frequency search procedure with a higher priority, which is to be performed earlier, searches frequencies that are likelier to be used than other frequencies that are searched by other subset-frequency search procedures.

4. The frequency search method as claimed in claim 1, wherein frequencies to be searched in the subset-frequency search procedures are updated whenever the frequency to be used is determined either by a subset-frequency search procedure or the all-frequency search procedure.

5. The frequency search method as claimed in claim 1, wherein frequencies to be searched by the subset-frequency search procedures are defined based on a history of frequencies actually determined.

6. A mobile station that searches a frequency to be used for communication in a mobile communication system, comprising:

subset-frequency search means that searches the frequency to be used by the mobile station for communication from one or a plurality of subsets of frequencies selected, based on predetermined criteria, out of all the frequencies that are allocated for communication of the mobile station in the mobile communications system, each of the subsets of the frequencies selected being scanned in a predetermined priority sequence until a frequency to be used is determined, all-frequency search means that searches the frequency to be used by the mobile station from all the frequencies that are allocated for communication of the mobile station in the mobile communications system, first search control means which activates the all-frequency search means when the subset-frequency search means fails in determining the frequency to be used after searching the frequency to be used by scanning the frequencies in the subsets of the frequencies, according to the predetermined priority sequences, second search control means that activates the subset-freciuency search means if no frequencies are determined as the frequency to be used by the all-frequency search means, and third search control means which activates the all-frequency search means when a predetermined timing condition is satisfied while the subset-frequency search means continues searching without determining the frequency to be used.

7. The mobile station as claimed in claim 6, wherein the subset-frequency search means is configured such that a subset of frequencies with a higher priority, which is to be searched earlier, contains fewer frequencies than other subsets of frequencies.

8. The mobile station as claimed in claim 6, wherein the subset-frequency search means is configured such that a subset of frequencies with a higher priority, which is to be searched earlier, contains frequencies that are likelier to be used than other frequencies that are searched by other subsets of frequencies.

9. The mobile station as claimed in claim 6, further comprising frequency search processing means that updates the subsets of the frequencies by the frequency to be used, every time the frequency to be used is determined by either of the subset frequency search means and the all-frequency search means.

10. The mobile station as claimed in claim 6, further comprising frequency search processing means that updates the subsets of the frequencies by a history of frequencies to be used, determined by either of the subset frequency search means and the all-frequency search means.

* * * * *